US012762105B2

(12) United States Patent
Liebkowiz et al.

(10) Patent No.: US 12,762,105 B2
(45) Date of Patent: Oct. 13, 2026

(54) SYSTEMS AND METHODS FOR PROMPT-BASED PROBE GENERATION

(71) Applicant: ServiceNow, Inc., Santa Clara, CA (US)

(72) Inventors: Yair Aharon Liebkowiz, Petah Tikva (IL); Robert Bitterfeld, Petah Tikva (IL); Tal Ben Ari, Ness Ziyonna (IL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 18/620,547

(22) Filed: Mar. 28, 2024

(65) Prior Publication Data

US 2025/0307228 A1 Oct. 2, 2025

(51) Int. Cl.
*G06F 16/00* (2019.01)
*G06F 16/23* (2019.01)
*G06F 16/242* (2019.01)
*G06F 40/30* (2020.01)

(52) U.S. Cl.
CPC ............ *G06F 16/23* (2019.01); *G06F 16/243* (2019.01); *G06F 40/30* (2020.01)

(58) Field of Classification Search
CPC combination set(s) only.
See application file for complete search history.

(56) References Cited

U.S. PATENT DOCUMENTS

| | | | | |
|---|---|---|---|---|
| 2012/0047347 | A1* | 2/2012 | Shankar | G06F 3/067 711/170 |
| 2022/0164229 | A1* | 5/2022 | Sahasranamam | G06F 9/5027 |
| 2025/0131464 | A1* | 4/2025 | Shiwarski | G06Q 10/02 |
| 2025/0139088 | A1* | 5/2025 | Weik | G06F 16/243 |
| 2025/0139151 | A1* | 5/2025 | Bianchini | G06F 16/3329 |

* cited by examiner

*Primary Examiner* — Yicun Wu
(74) *Attorney, Agent, or Firm* — FLETCHER YODER PC

(57) ABSTRACT

A method including parsing, via a Large Language Model (LLM), a configuration file comprising one or more attributes associated with one or more components of a network, wherein parsing the configuration file comprises generating a probe based on the one or more attributes. The method also includes executing the probe for discovery of one or more attributes associated with the one or more components of the network and updating a resource management database based on the one or more attributes.

20 Claims, 10 Drawing Sheets

SYSTEMS AND METHODS FOR PROMPT-BASED PROBE GENERATION

TECHNICAL FIELD

The present disclosure relates generally to discovery of attributes of various technology types. Specifically, the present disclosure relates to automatic generation of discovery probes for use in discovery operations running in a networked environment.

BACKGROUND

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Furthermore, the IT infrastructure solutions may be used to discover computing resources of the IT infrastructure and/or it connected devices. The computing resources (e.g., configuration items) hosted in distributed computing (e.g., cloud-computing) environments may be disparately located with each having its own functions, properties, and/or permissions increasing benefits of discovery. Such resources may include hardware resources (e.g. computing devices, switches, firewalls, storage devices and data stores, memory devices etc.) and software resources (e.g. database applications, productivity applications, resource management/financial applications). These resources may be provided and provisioned by one or more different providers with different settings or values. Accordingly, it may be desirable to develop techniques for generating probes to automatically discover computing resources in order to make the operations of the enterprise more efficient. It may also be desirable, to implement systems and methods to establish a graphical user interface for efficient automated generation of such probes.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Systems and methods are disclosed herein that enable generation of discovery probes via prompts, including prompts provided by a user. In this manner, configuration item (CI) discovery may be executed without need for hard-coding of probes for unsupported CI types. Further, a prompt directed probe generator, described herein, may automatically generate a probe via an input (e.g., a prompt, one or more selected attribute types, a configuration file). In one example, the prompt directed probe generator may parse configuration files to identify and/or store attributes and/or CIs within a resource management database. In one such embodiment, the prompt directed probe generator may use a Large Language Model (LLM) to generate the probe via the prompt and the configuration file. In this manner, the LLM may automatically identify and parse the selected attributes from configuration files associated with the various hardware and/or software components of an enterprise IT infrastructure.

In certain aspects the present disclosure is generally directed to a method including parsing, via a Large Language Model (LLM), a configuration file comprising one or more attributes associated with one or more components of a network, wherein parsing the configuration file comprises generating a probe based on the one or more attributes. The method also includes executing the probe for discovery of one or more attributes associated with the one or more components of the network and updating a resource management database based on the response to the execution of the probe.

The present disclosure is directed to a method including receiving, via a user interface, one or more inputs including one or more selected attribute type associated with one or more components of a network, a configuration file, and a prompt indicative of instructions to identify the one or more attribute type. The method also includes parsing, via a Large Language Model (LLM), the configuration file comprising the one or more selected attribute type and outputting one or more attributes of the configuration file based on the one or more selected attribute type. Further, the method includes recursively applying the LLM to the configuration file based on a validity score, wherein the validity score is based on a correlation of the one or more selected attribute type and the one or more attributes, determining that the validity score associated with satisfies a threshold, and outputting an updated probe in response to the validity score satisfying the threshold, wherein outputting the updated probe comprises outputting the updated probe for display via the user interface.

The present disclosure is directed to a non-transitory computer-readable storage medium including processor-executable routines that, when executed by a processor, cause the processor to perform operations. The operations include parsing, via a Large Language Model (LLM), a configuration file comprising one or more attributes associated with one or more components of a network, wherein parsing the configuration file comprises generating a probe based on the one or more attributes. The operations also include executing the probe for discovery of one or more selected attributes associated with the one or more components of the network and updating a resource management database based on the one or more selected attributes.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
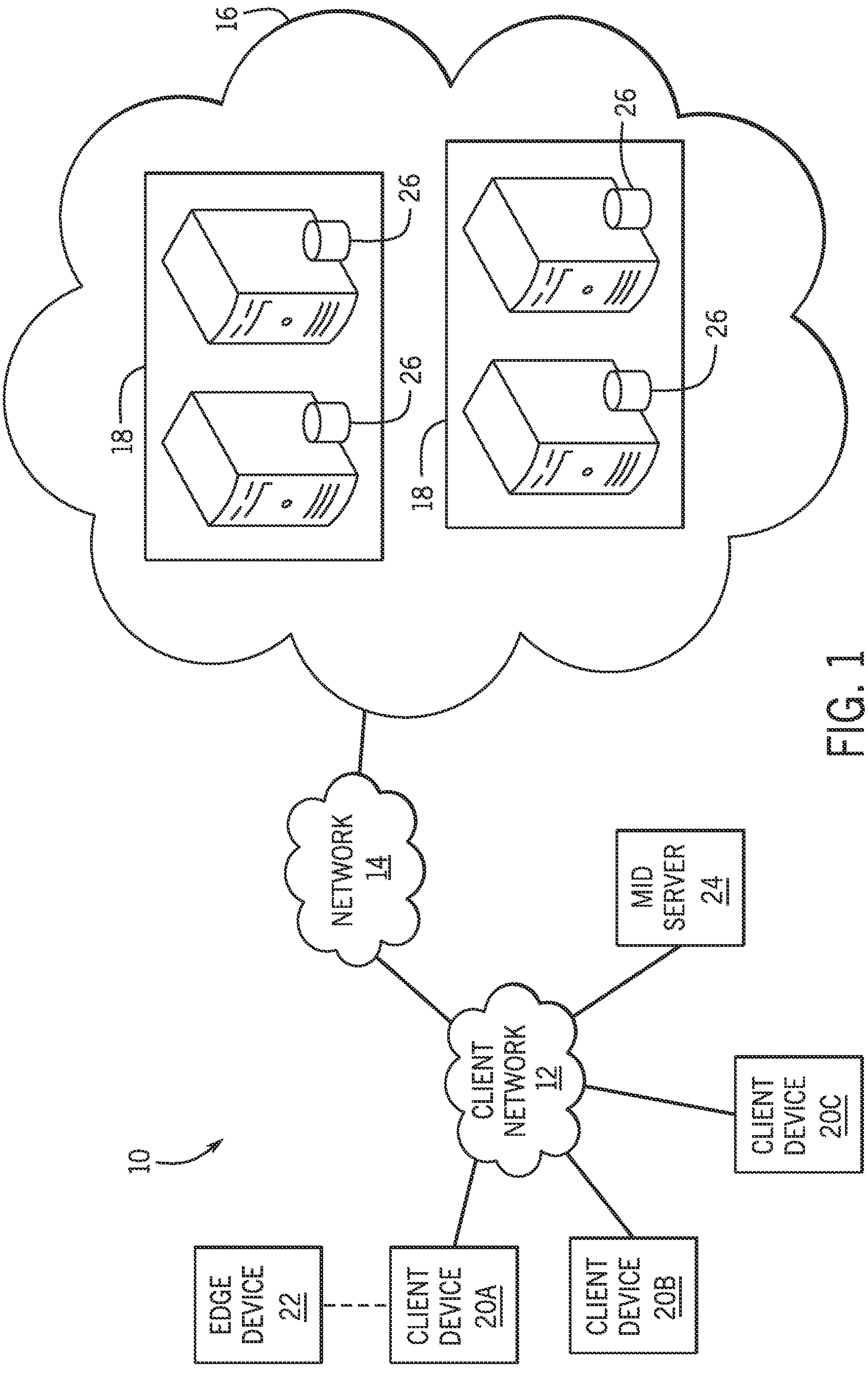
FIG. 1 is a block diagram of an embodiment of a multi-instance cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function(s) described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

A configuration management database (CMDB) (e.g., IT management database, resource management database) provides enterprises with centralized storage of data associated with IT assets and configuration items (CIs). CI discovery executed on a given infrastructure may be used to track and/or map the CIs that are present on a connected IT environment. That is, CI discovery is the process of finding the various hardware and/or software components (e.g., CIs) of an enterprise. CIs serve as building blocks of the CMDB and track various IP-related components of the enterprise. The various components may include hardware components (e.g., servers, workstations, routers, firewalls, switches, network storage devices, and so forth, as well as components of such hardware systems, such as but not limited to processors, memory modules, bulk storage structures, networking circuitry or hardware, and so forth), software components (e.g., operating systems, productivity software, resource managements or financial software, software accessing or managing databases, and so forth), additional components (e.g., hardware and/or software licensing, virtual machines, portfolios, networks), or a combination thereof. Further, CIs may include one or more attributes associated with the CIs such as name, IP address, MAC address, version number, update status or history, location, and other information related to the various components connected to a given network, such as an enterprise's network. CIs are generated through integration, discovery, service mapping, or manual input. For example, CI discovery generates CIs via a horizontal method, scanning IP addresses within the enterprise's network to find software and hardware information to create an inventory of all assets (e.g., including cloud resources) and devices forming the CMDB. Additionally and/or alternatively, service mapping is a top down CI generation approach that maps components of the enterprise based on connections between the various components. Generation of CIs via discovery and service mapping both include tracking of one or more selected attributes associated with the various components. For example, in some instances, the selected attributes may include attributes such as a host, a port, a protocol, and the like related to the various components. When the selected attributes are found by such routines it may be beneficial to store the selected attributes as part of a respective CI record within the CMDB or similar IT operations management database.

A portion of selected attributes and/or a CI may be extracted from a configuration file associated with a particular component of the enterprise. Configuration files may include data that enables interactions with the particular component of the enterprise in specific ways. For example, configuration files may include preferences (e.g., color schemes, storage paths, plug-ins, IP addresses, and the like), settings (e.g., port, server, IP address), and paths (e.g., log files, plugins, filenames) for a given hardware or software component or for a component with which the respective hardware and/or software component interacts. To extract the selected attributes (e.g., selected preferences, selected setting, selected paths) from the configuration file, the configuration file may be parsed via a probe during a discovery process. The probe may include code or other executable language that, when executed causes one or more parsing steps (e.g., connection sections) to be performed to extract the selected attributes for generation or updating of a CI. A number of steps performed by the probe may make generation of the probe cumbersome. For example, each component of the various components that may be the target of a discovery operation may have differences in associated configurations files. As such, each probe may require execution of many steps to discover, map, and parse the selected attributes. Each step executed by the probe may typically be hard-coded for each CI type (e.g., hardware, communication, software, systems, service, and the like). In this manner, the probes are manually organized for discovery and/or service mapping of each component. In some instances, changes (e.g., version updates, vendor differences, and the like) to a particular configuration file leads to failure of probes during discovery, identification, and/or parsing of the selected attributes of the particular component. As such, extraction and parsing of the selected attributes requires technical skill and may be error prone. Additionally, large gaps may exist as various unsupported CI types require hard-coding of additional probes for successful service mapping or discovery.

With the preceding in mind, systems and methods are disclosed herein that enable generation of a probe via one or more prompts. In this manner, CI discovery may be executed without need for hard-coding of probes for unsupported CI types. Further, a prompt directed probe generator, described herein, may automatically generate a probe via an input (e.g., a prompt, a configuration file). The prompt directed probe generator may parse configuration files to improve performance of probes used generate, update, and/or store attributes and/or CIs within the CMDB. The prompt directed probe generator may, in one embodiment, use a Large Language Model (LLM) to generate the probe via the prompt and the configuration file. In this manner, the LLM may automatically identify and parse the selected attributes relevant to a probe being generated using configuration files associated with the various components.

For example, in some embodiments, the LLM may receive a prompt and a portion of the configuration file and/or a configuration file path including reference to the selected attributes desired to be identified and extracted. As such, the LLM may identify the selected attributes based on the prompt and output a content file including the identified attributes. Further, the LLM may parse the content file and generate a probe for use in discovery. Additionally and/or alternativity, the LLM may output the probe (e.g., a code) corresponding to a particular prompt and extract and/or generate steps required for discovery or service mapping via the CI. In particular, the LLM may parse the configuration file to extract attributes usable to discover hardware and/or software of a network. In some instances, the probe may be executed for further discovery of additional components and/or modification of the CMDB.

Additionally, a system may provide a graphical user interface (GUI) that enables a user to provide the prompt and/or the configuration file to the LLM. The GUI may display parameters extracted by the LLM based on the configuration file. The GUI may also display the probe generated based on a process of extraction and parsing of the selected attributes via the particular prompt. The user and/or a CMDB data validator (e.g., successive parsing using the LLM) may verify and/or modify the probe. Further, the GUI may display the output the selected attributes (e.g., CI) for review and/or approval by the user prior to population within the CMDB.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform in which hardware, software, and/or other aspects of the client network 12 and/or cloud-based platform are regularly tracked and monitored. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, server, or software-implemented agent, such as a management, instrumentation, and discovery (MID) server 24 (such as a discovery server, more generally, in accordance with aspects of the present discussion) that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to as application nodes, application servers, virtual server instances, application instances, or application server instances), where one or more virtual servers 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
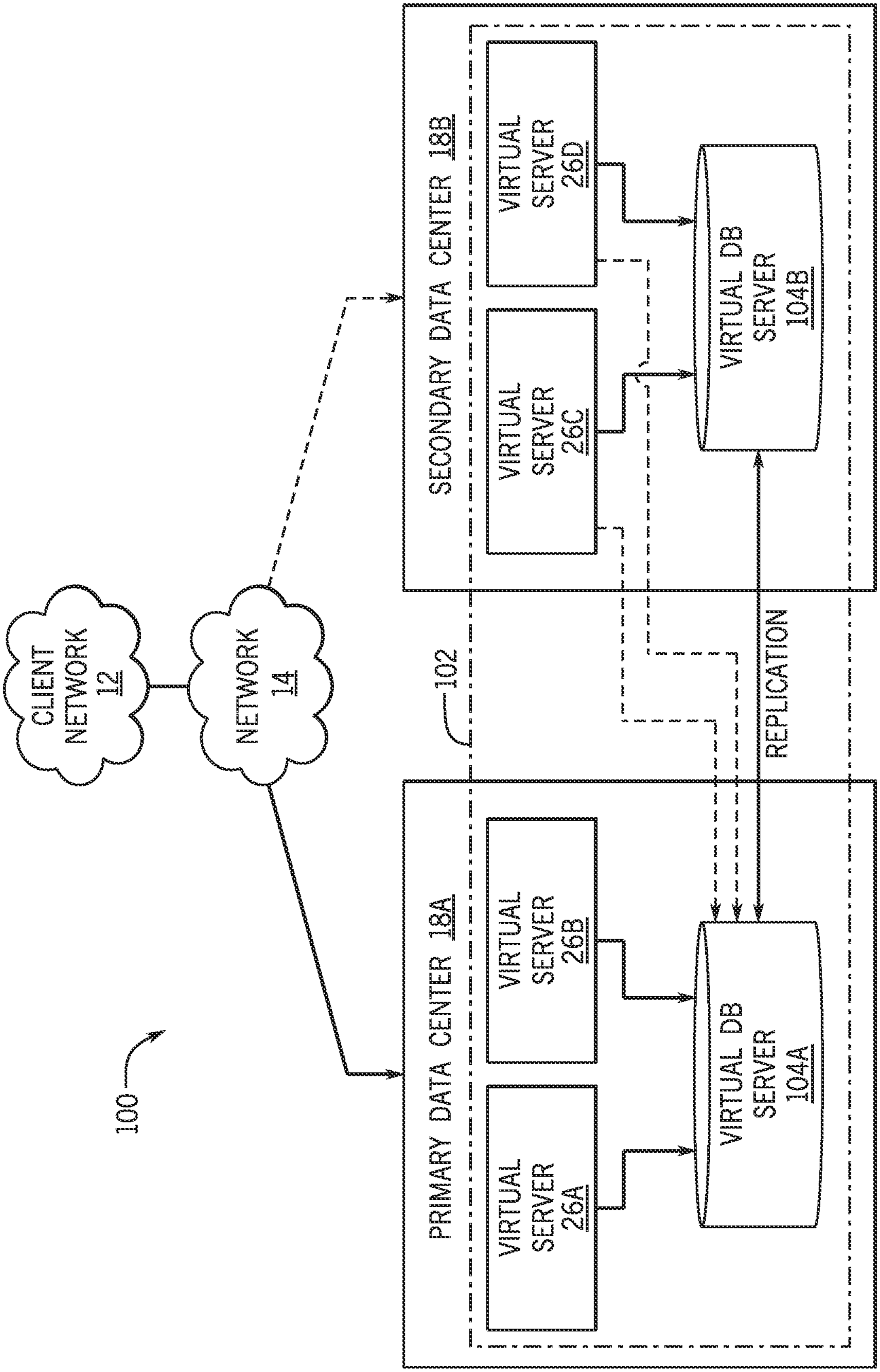
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
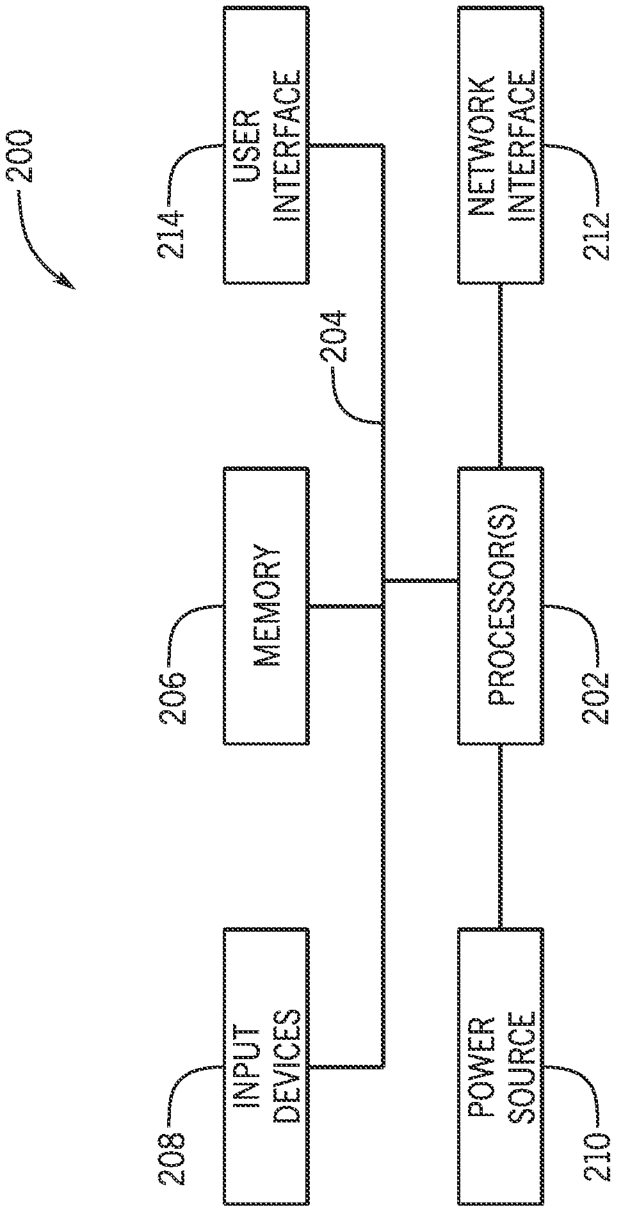
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition to and/or alternative to the display, the user interface 214 may include other devices for interfacing with a user, such as lights (e.g., LEDs), speakers, and the like.

Figure 4:
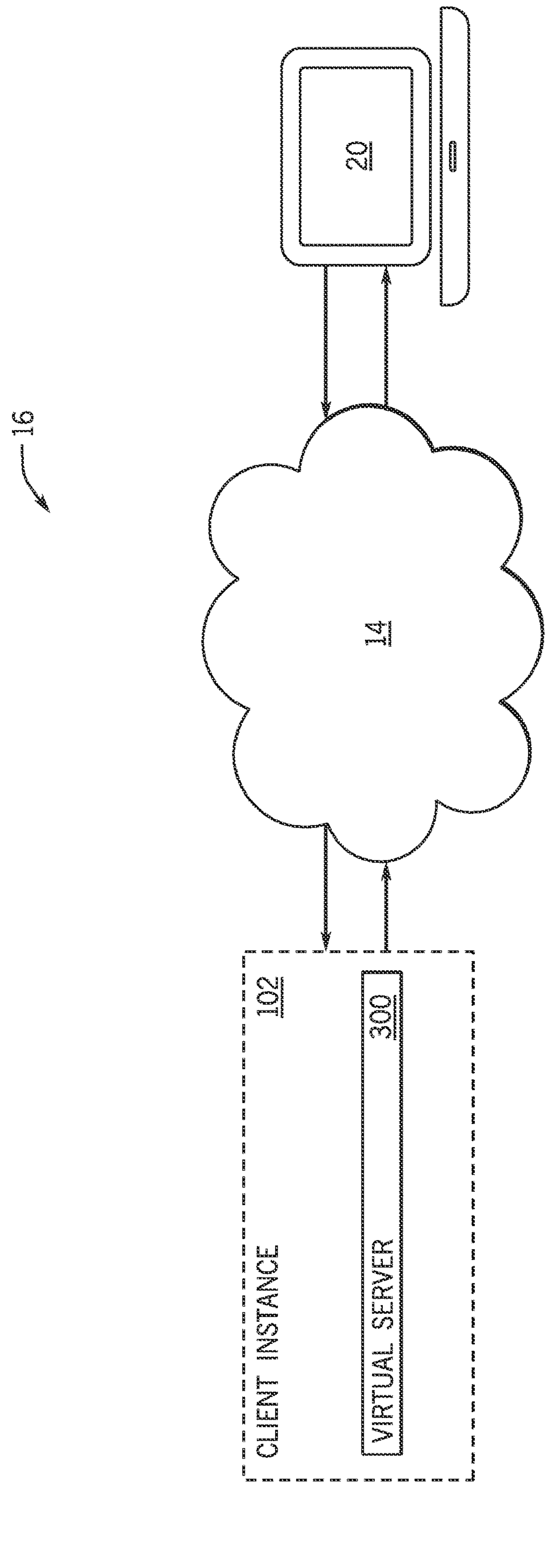
FIG. 4 is a block diagram illustrating an embodiment in which a virtual server supports and enables the client instance, in accordance with aspects of the present disclosure.

With the preceding in mind, FIG. 4 is a block diagram illustrating an embodiment in which a virtual server 300 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser of the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

Figure 5:
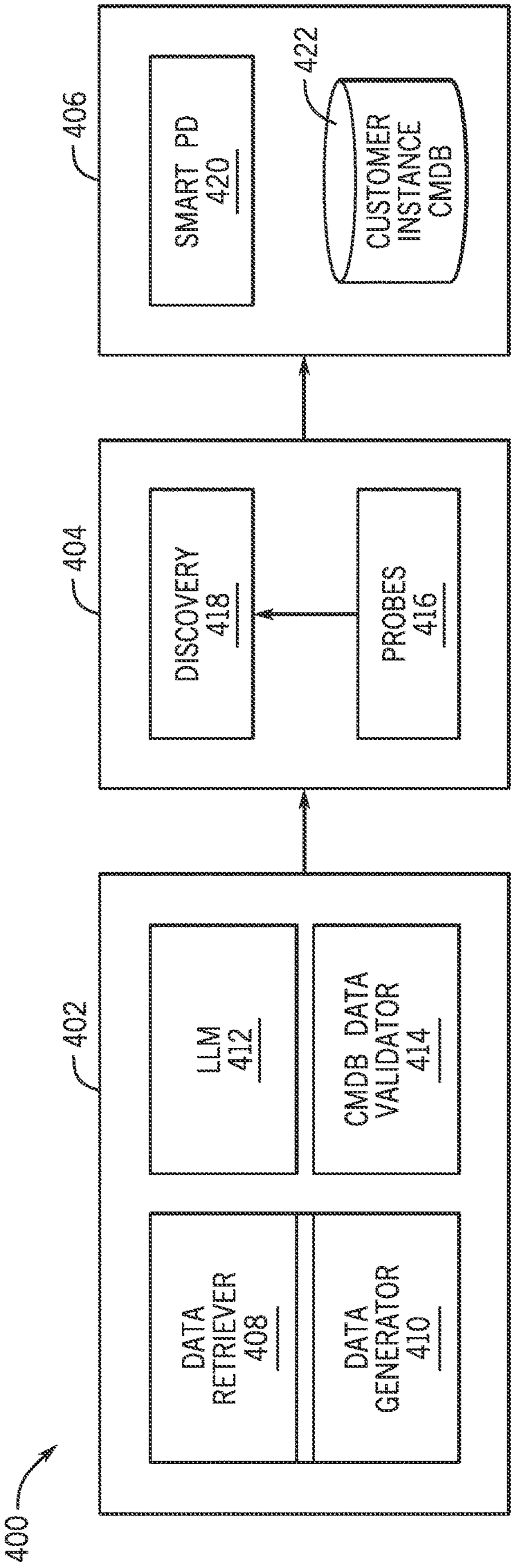
FIG. 5 is a schematic illustrating a framework of a prompt directed probe generator to be utilized within an enterprise, in accordance with aspects of the present disclosure.

With this in mind, FIG. 5 is a schematic illustrating a framework 400 of a prompt directed probe generator to be utilized within an enterprise. The prompt directed probe generator promotes automation of probe (e.g., discovery probe) creation to streamline discovery and service mapping functions of the enterprise. The prompt directed probe generator may receive inputs, retrieve and/or generate data, output one or more selected attributes, validate an accuracy of selected attributes, generate a probe, execute or facilitate execution of discovery resulting in configuration items (CIs) being updated and/or stored within a CMDB or comparable IT resource management database. As shown, one or more stages may be included in the framework 400 of the prompt directed probe generator. It should be noted, that the illustrated stages are provided as examples and more, fewer, or different stages may be included in the framework 400 of the prompt directed probe generator. As shown, the stages included in the prompt directed probe generator may include a probe generation stage 402, a probe execution stage 404, and a CMDB maintenance stage 406.

The probe generation stage 402 may receive inputs, retrieve and/or generate data, output selected attributes, validate the accuracy of the selected attributes, generate the probe, or a combination thereof. In some instances, the probe generation stage 402 is initiated upon submission of an input (e.g., a query or command). In particular, the input may include a prompt, a configuration file, a configuration file path, and/or one or more selected attribute types. For example, the prompt may include alphanumeric text that may be used as queries to provide instructions to the prompt directed probe generator related to a desired output. In this manner, the prompt may be used in subsequent steps of the probe generation stage 402, discussed in detail below. Additionally and/or alternatively, the input of the probe generation stage 402 may include the configuration file associated with a particular component (e.g., software component, hardware component, additional component) of the enterprise. The configuration file may include data that enables interactions with each component of the enterprise in specific ways. For example, configuration files may include preferences (e.g., color schemes, storage paths, plug-ins, IP addresses, and the like), settings (e.g., port, server, IP address), and paths (e.g., log files, plugins, filenames). In some instances, the configuration file path may be provided as the input and the probe generation stage 402 may follow the configuration file path to extract a particular portion.

In some embodiments, the input received at the probe generation stage 402 of the framework 400 is indicative of one or more selected attribute types of the components of the enterprise. That is, each component (e.g., software component, hardware component, additional component) has associated attributes. In this manner, the selected attribute types may include a portion of attributes associated with each component. In some instances, the selected attribute types may include attributes desired to be tracked by the enterprise's IT infrastructure. Attributes of each component may include parameters stored within an associated configuration file of a particular component and/or additional parameters. In this manner, the associated configuration file may include various attributes (e.g., name, label, IP address, operating system, version number, description, model, owner, location, time stamp, and the like). As such, a portion of the attributes included in a configuration file may be selected (e.g., selected attributes) to be located by the prompt directed probe generator.

In this manner, the input (e.g., the prompt, the configuration file, the configuration file path, the selected attribute types, additional inputs, or a combination thereof) may direct the probe generation stage 402 to initiate a data retriever 408 and/or a data generator 410 to locate and/or generate data associated with the input. The data retriever 408 may retrieve data from a database, the CMDB, a data repository, and the like. In some instances, the data retriever 408 may retrieve the configuration file and/or a portion of the configuration file based on a configuration file path input. The configuration file path input may include a file path of a particular configuration file associated with a component (e.g., hardware component, software component, additional component) of the enterprise. In other instances, the data retriever 408 may execute structure query language (SQL) to fetch data from relational databases. Additionally and/or alternatively the data retriever 408 may fetch data from non-relational databases.

In some embodiments, the data generator 410 of the probe generation stage 402 may be used to generate data. It should be noted, that the data generator 410 may generate data in addition or alternatively to retrieving data via the data retriever 408. In some instances, the data generator 410 may generate data (e.g., synthetic data) according to a pattern. For example, the pattern may be based on a container template library (CTL) template. In certain embodiments, data (e.g., synthetic data) generated by the data generator 410 may be used to train an LLM 412. For example, the prompt directed probe generator may execute the probe generation stage 402 of the framework 400 using synthetic data to test and/or train an LLM 412. In this manner, the synthetic data may be used to optimize, validate, and/or test reliability (e.g., ground truth) of the probe generation stage 402.

With this in mind, the LLM 412 disclosed herein is a probabilistic model of a natural language process used for general-purpose language generations. LLMs typically include one or more artificial neural networks having a transformer-base architecture. LLMs learn statistical relationships from text documents through training processes that may be supervised, semi-supervised, or self-supervised. During training, LLMs may learn syntax, semantics, and/or ontology. LLMs, when used for text generation, receive an input text and iteratively predict the next word or token. It should be understood that the LLM shown in FIG. 5 receives inputs (e.g., natural language inputs) and uses the LLM 412 to automatically build workflows based on the inputs. In some instances, the workflows may include one or more steps to extract and parse the selected attributes and output an associated probe. As used herein, "natural language" may be understood to be language (e.g., an utterance, verbalization, text or written comment or field, and so forth) as either written, typed, or spoken by a human being. In this manner, a natural language input may be one or more human-readable alphanumeric character strings, or audio, the meaning of which may be understood by a human. In some embodiments, the LLM 412 may be a "out of the box" LLM provided by a service provider. However, in other embodiments, the LLM 412 may be customized to the client instance 102, either with specific training, specific customized settings, or both.

With this in mind, the LLM 412 may be used within the probe generation stage 402 to extract and parse the selected attribute types (e.g., identified by the input) associated with various components of the enterprise. For example, the LLM 412 may provide one or more selected attribute outputs and/or a probe associated with a particular CI and/or CI type. In should be noted, that the selected attribute outputs may define a portion of the CI associated with a particular component. Further, in the disclosed embodiments described herein, the selected attribute types may include an entire CI. That is, attributes are characteristics that describe or define CIs therefore the selected attribute output may include all attributes of the CI or only a portion of such attributes.

Additionally and/or alternatively, the LLM 412 may output the probe (e.g., discovery probe). The probe may include executable code that may be used to extract and parse one or more selected attributes from configuration files based on the selected attribute types indicated as the input. In some instances, the probe output by the LLM 412 may include one or more sets of probes used (e.g., executed) during a discovery operation. It should be noted, that the probe may include a pattern (e.g., a discovery pattern) used to identify a target (e.g., a hardware and/or software target) on the network undergoing discovery. That is, the LLM 412 may output a pattern that is incorporated in or otherwise part of the probe. The pattern may include a signature or code particular to a probe used to execute the discovery process 418 in addition to one or more additional parameters (e.g., sensors, pattern probe). For example, the input of the probe generation stage 402 may include a prompt (e.g., including a configuration file pat) directing the LLM 412 to extract and parse an IP address and an operating system of a particular hardware component of the enterprise. As such, the LLM 412 may receive the prompt, access an associated configuration file of the particular hardware component, parse and extract the IP address and the operating system from the associated configuration file and output the selected attribute output. In this manner, the selected attribute output may be analyzed by a CMDB data validator 414 to compare the selected attribute types received as the input to the selected attribute output. Once the CMDB data validator confirms that the selected attributes received as the input and the selected attribute output match the LLM 412 may output a probe.

With this in mind, the CMDB data validator 414 may be used to validate the selected attributes output by the LLM 412. In this manner, the CMDB data validator 414 may compare the selected attribute type received at input (e.g., a known input) to the selected attribute output by the LLM 412. In some instances, the CMDB data validator 414 may iteratively execute the LLM 412 until the selected attribute type and the selected attribute output match (e.g., ground truth achieved). For example, a user and/or an application may evaluates the selected attribute and/or the probe output by the LLM 412. In some instances, the selected attribute and/or the probe output by the LLM 412 may not align with the selected attribute type as indicated in the prompt. As such, the LLM 412 may iteratively optimize outputs based on an updated prompt. In this manner, the CMDB data validator 414 may analyze outputs of the LLM 412 based on the updated prompt to determine a validity. In some embodiments, the LLM 412 may continue iterative optimization until the CMDB data validator 414 determines validity (e.g., output of an updated probe) is achieved. In some embodiments, the optimized probe is defined as a probe that can extract and parse the selected attributes indicated in the prompt. In this manner, the LLM 412 and the CMDB data validator 414 may reduce the complexity and burden of hard-coding probes for use in discovery.

In some embodiments, the probe generation stage 402 is advanced to the execution stage 404. The execution stage 404 may use one or more probe outputs 416 generated by the probe generation stage 402 to run discovery (e.g., system mapping) of the various components of the enterprise. In certain embodiments, the execution stage 404 includes receiving a probe output 416 (e.g., one or more probes) provided by the probe generation stage 402 of the prompt directed probe generator. In this manner, the probe output 416 may be used to execute a discovery process 418. For example, the discovery process 418 may identify, parse, and extract the selected attributes associated with hardware, software, and/or additional components of the enterprise. As such, a specific probe of the probe output 416 may be used during the discovery process 418 to identify additional components of a similar type (e.g., selected attribute type, CI type).

In some embodiments, the execution stage 404 is advanced to the CMDB maintenance stage 406. The CMDB maintenance stage 406 may include a smart prompt discovery graphical user interface (GUI) 420 that may provide streamlined access to the prompt directed probe generator. For example, the smart prompt discovery GUI 420 may provide an interface to a user including one or more steps of the framework 400. Further, the CMDB maintenance stage 406 may include or access a customer instance CMDB 422 (e.g., resource management database). The customer instance CMDB 422 may store the selected attributes identified by the probe during the execution stage 404. In some instances, the customer instance CMDB 422 may be used to store the probe generated in the probe generation stage 402 for future discovery operations. For example, the execution stage 404 may use the probe output 416 to execute the discovery process 418 and discover a software component. The selected attribute outputs may be stored in the customer instance CMDB 422 which may be accessed for use in tracking the particular component within the CMDB of the enterprise. Further, in some instances the selected attribute outputs may be used to control access and/or connectivity by the enterprise's IT infrastructure.

Figure 6:
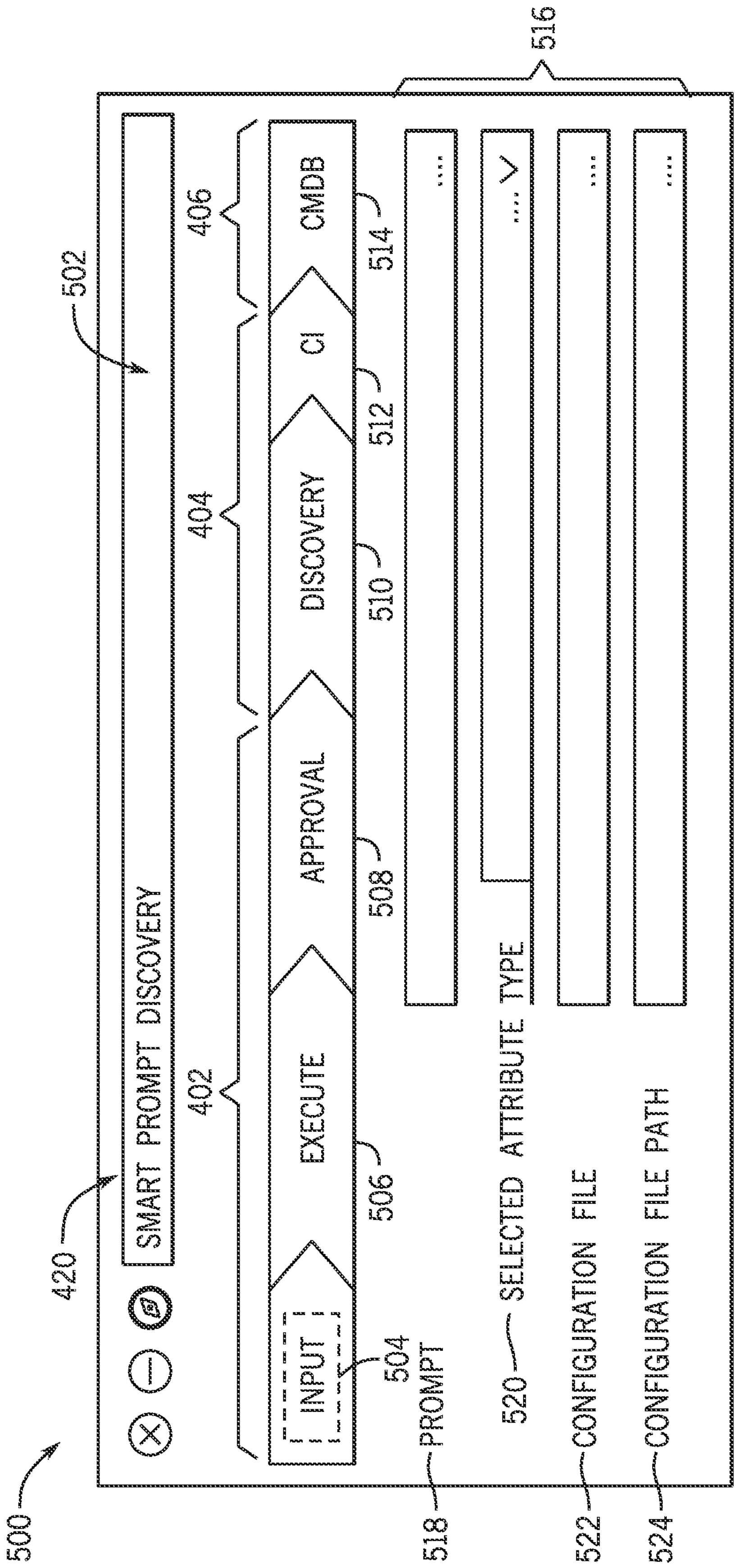
FIG. 6 is schematic embodiment of a user interface of the smart prompt discovery GUI, in accordance with aspects of the present disclosure.

With the preceding in mind, FIG. 6 is a schematic embodiment of a user interface 500 of the smart prompt discovery GUI 420. The user interface 500 may display an interface having a dashboard 502 (e.g., command center) that may be used to streamline prompt input, probe generation, development, and management of the prompt-directed probe generator. In this manner, the prompt-directed probe generator provides streamlined probe creation to the users via the dashboard 502. The dashboard 502 may include various widgets (e.g., user interface widgets, apps, or applets) providing alerts, notifications, status updates, user requests, value assessments, selected attribute outputs, probe outputs, and the like. Further, the prompt-directed probe generator may include one or more selectable features or tabs corresponding to steps of the probe generation stage 402, the probe execution stage 404, and the CMDB maintenance stage 406.

In some embodiments, the various widgets of the dashboard 502 include one or more of an input widget 504, an execute widget 506, an approval widget 508, a discovery widget 510, a CI widget 512, and/or a CMDB widget 514. The input widget 504 may display a plurality of parameters 516 for input by the user. The parameters 516 may include a prompt 518, one or more selected attribute type 520, a configuration file 522, a configuration file path 524, or a combination thereof. It should be noted, that in some embodiment, additional, fewer, and/or alternative parameters may be included in the parameters 516 of the input widget 504. As such, it should be recognized that the input widget 504 may include additional information related to active development of prompts to inform probe generation.

In certain embodiments, the input widget 504 may receive the prompt 518 including alphanumeric text to direct the LLM to generate a probe. For example, in some instances, the prompt 518 may include a natural language phrase or clause, such as "create a probe to find a network component including connection step details in json." The selected attribute type 520 may be input directing the LLM to include a protocol, a Rport, a Lport, and a log. Further, the configuration file 522 and/or the configuration file path 524 may be provided to the LLM in the input widget 504. In this manner, the LLM may receive the prompt 518, the selected attribute type 520, and the configuration file 522 and proceed to parse and extract the selected attribute output.

In certain embodiments, the input widget 504 may display active (e.g., dynamically updated) tracking of the framework 400 as described above in reference to FIG. 5. For example, the smart prompt discovery GUI 420 may display tracking of the prompt-directed probe generator to provide the user with active insight to the probe generation stage 402, the probe execution stage 404, and the CMDB maintenance stage 406. In this manner, productivity and workflow management may be readably accessed by the user. It should be noted, that in some embodiments one or more of the widgets may be initiated or interacted with in any suitable order. For example, the approval widget 508 may be executed simultaneously with the execute widget 506.

It should be recognized that while the illustrated embodiment shows the dashboard 502 including the input widget 504, the execute widget 506, the approval widget 508, the discovery widget 510, the CI widget 512, and the CMDB widget 514 on the same screen, the dashboard 502 may display each of these widgets on separate screens within the user interface 500 and/or may allow a user to select which widgets will be shown, the placement of such widgets, and so forth. Additionally, in certain embodiments one or more conditions or rules may be created or parameterized by a user to control when and/or where a widget is displayed, such as prompting display or updating of a widget in response to updated data monitored by the widget (e.g., display of a widget or placement of the widget may be updated in response the data conveyed by the widget changing or being updated). Additionally or alternatively, the screen via the dashboard 502, may display any combination of the input widget 504, the execute widget 506, the approval widget 508, the discovery widget 510, the CI widget 512, and the CMDB widget 514.

Figure 7:
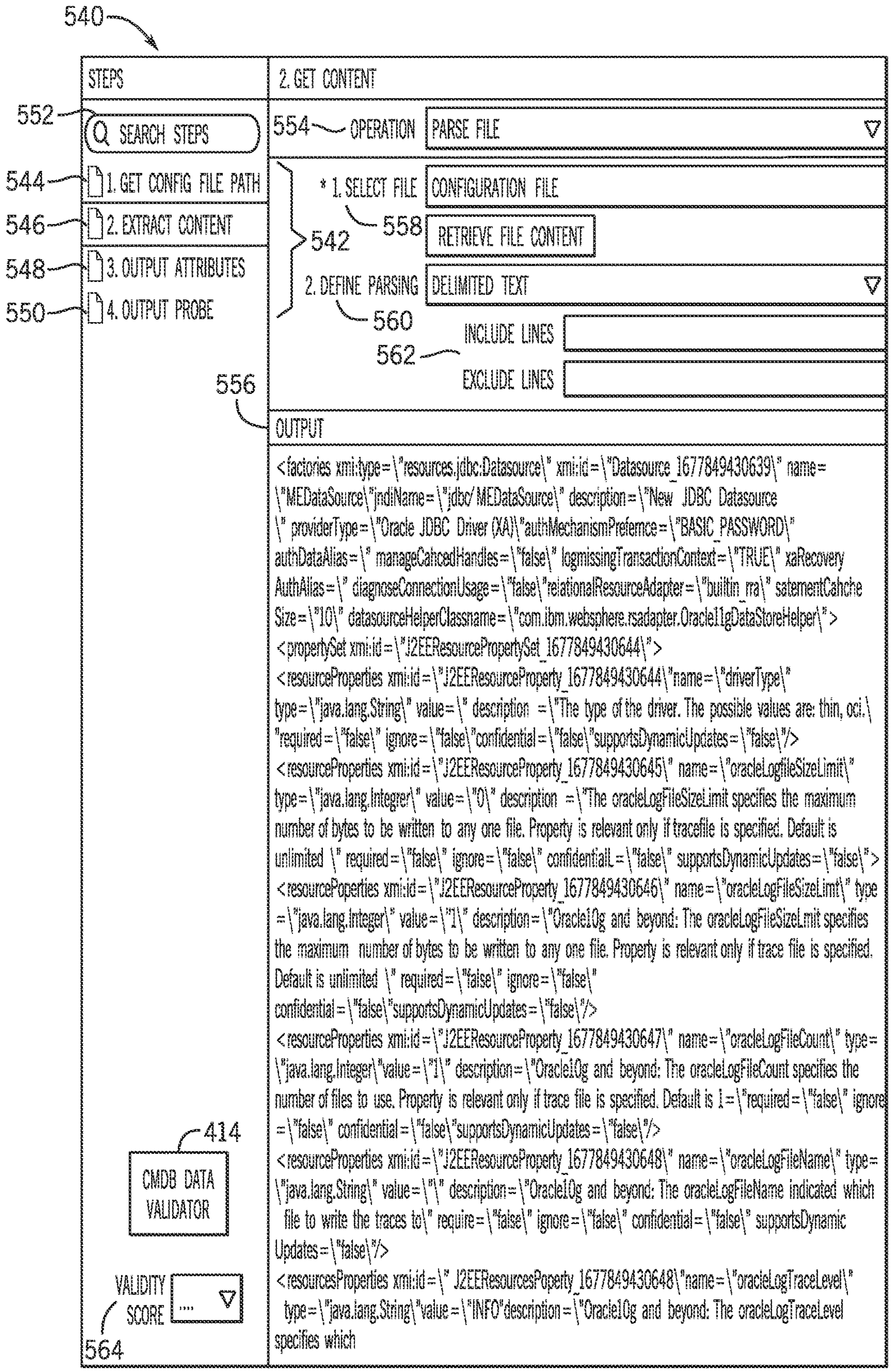
FIG. 7 is a schematic embodiment of a user interface of the execute widget of the prompt-directed probe generator, in accordance with aspects of the present disclosure.

Referring now to FIG. 7, the prompt-directed probe generator may display the execute widget 506 having one or more steps on a screen 540 of the user interface. The execute widget 506 may include one or more tabs 542 representing steps taken by the LLM 412 based on the inputs entered via the input widget 504. As shown, the steps include a configuration file path retrieval step 544, an extract content step 546, an output attributes step 548, and an output probe step 550. It should be noted, that additional, fewer, and/or alternative steps may be included in the execute widget 506. In some instances, the tabs 542 may be searchable via a query bar 552.

In some embodiments, the configuration file path retrieval step 544 may follow the configuration file path 524 and/or load the configuration file 522 provided by the input widget 504. In this manner, the LLM 412 may proceed to the extract content step 546 as illustrated in FIG. 7. As such, the LLM 412 may perform extraction and parsing on the configuration file 522 to provide content associated with the prompt 518 and the selected attribute type 520. In some embodiments, the screen 540 of the user interface may display an operation field 554 providing the user with information related to a function of the LLM 412. As shown, the operation field 554 may be a parse file command. In this manner, a parsed configuration file 556 may be displayed on the screen 540. Further, in some instances, a file field 558 may be included to allow the user to determine a location in which the configuration file parsed by the LLM 412 is located. Further, a parsing format field 560 may allow selection of a format of the parsed configuration file 556 (e.g., delimited text, comma separated value, tab-delimited text, and the like) In this manner, the user and/or the prompt-directed probe generator may analyze the parsed configuration file 556. In some instances, the user interface may be modified to allow one or more lines to be included and/or excluded via a viewer tool 562.

Figure 8:
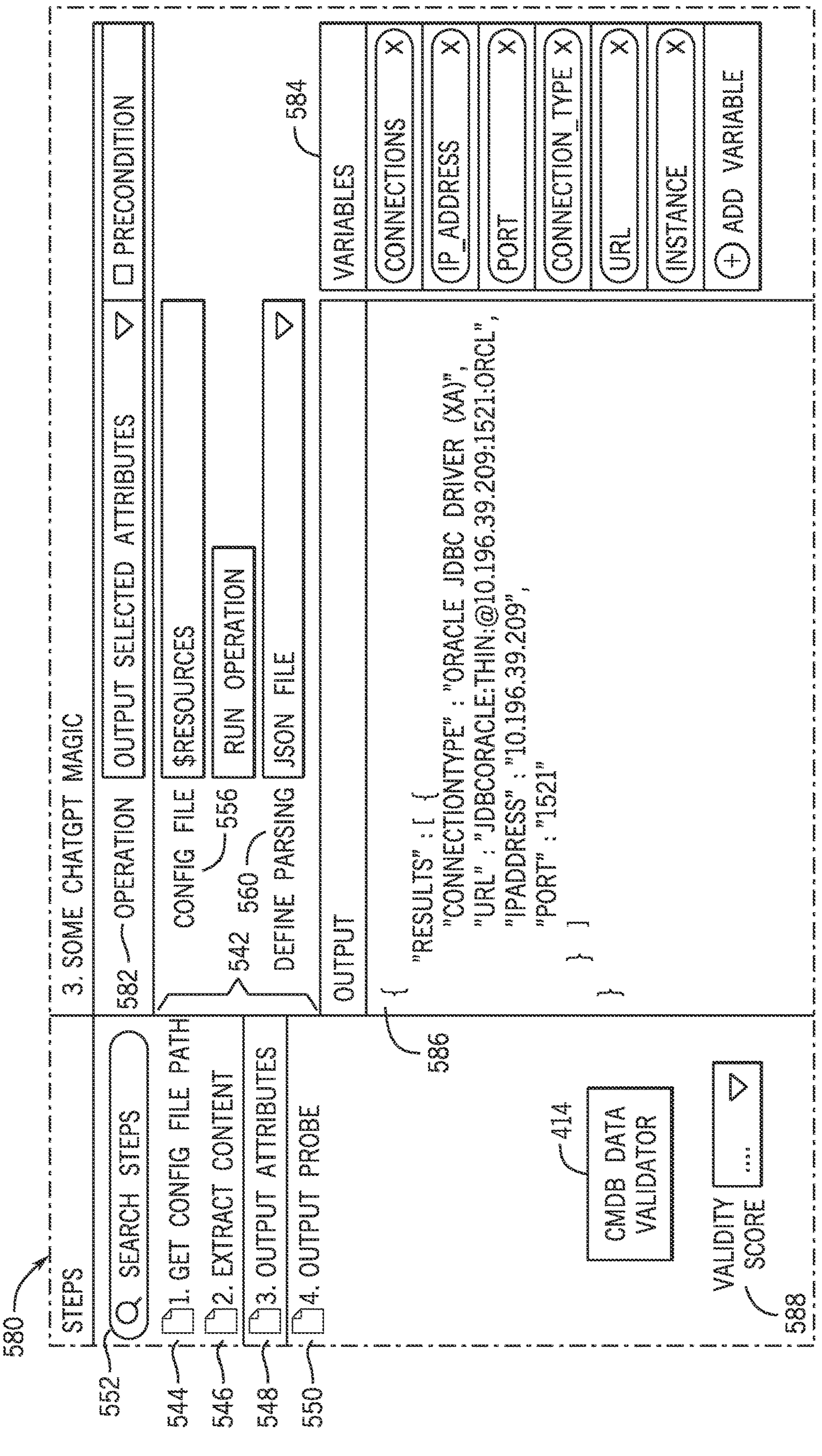
FIG. 8 is a schematic embodiment of a user interface of the output attributes step displayed on a screen, in accordance with aspects of the present disclosure.

With this in mind, the execute widget 506 may proceed to the output attributes step 548, as illustrated in FIG. 8. Referring now to FIG. 8 a schematic embodiment of the user interface of the output attributes step 548 of the prompt-directed probe generator is depicted as displayed on a screen 580. As shown, the output attributes step 548 may display the screen 580 during the execute widget 506 as outlined in reference to FIG. 6. The user interface may allow the user to select, view, and/or manage one or more fields deployed by the output attributes step 548. The various fields may include an operation field 582, the parsed configuration file 556, the parsing format field 560, and the selected attribute type field 584. In some embodiments, the execute widget 506 at the output attributes step 548 may provide one or more selected attribute outputs 586.

In some embodiments, the CMDB data validator 414 may be selected on the user interface in order to perform actions of the approval widget 508. It should be noted, that selection of the CMDB data validator 414 on the screen 580 may open one or more additional screens. In some embodiments, the CMDB data validator 414 may be executed on the screen 580. For example, the CMDB data validator 414 of the prompt-directed probe generator may assess the validity of the selected attribute outputs 586. This validation may include comparison of the selected attribute outputs 586 to a known input such as the selected attribute type 520 input via the input widget 504. In some embodiments, the validity of the selected attribute outputs 586 is determined via the processor based on predetermined metrics (e.g., similarity to existing parsed attributes, similarity to input selected attribute type, similarity to existing CIs). If the selected attribute outputs 586 is not verified (e.g., does not meet a threshold level) the user interface may alert the user and/or return to the input widget 504. In some embodiments, an updated prompt may be provided to the input widget 504 and the approval widget 508 may iteratively proceed until the validity of the selected attribute outputs 586 is achieved (e.g., meets the threshold). The threshold value may be determined based a validity score 588. The validity score 588 may be received as an input from the user. In some instances, the validity score may be based on the threshold based on a similarity of the selected attribute type 520 within the selected attribute outputs 586.

For example, the input widget 504 may direct the LLM 412 to extract and parse a driver from a provided configuration file of an associated component of the enterprise at the extract content step 546. Further, the prompt 518 and/or the selected attribute type 520 may direct the LLM to extract one or more connections as indicated by the selected attribute type field 584. For example, the connections may include an IP address 590, a port 592, a connection type 594, a URL 596, and an instance 598 from the configuration file. As such, the LLM 412 may execute the configuration file path retrieval step 544, and the extract content step 546. The LLM 412 may then output the parsed configuration file 556. Additionally and/or alternatively the LLM 412 may output the selected attribute outputs 586. The approval widget 508 may initiate the CMDB data validator 414 at the output attributes step 548 to correlate the selected attribute type 520 to the selected attribute outputs 586. The correlation and/or the validity may be based on a received validity score 588. For example, the validity score 588 may require a more than 80% match between the selected attribute type 520 and the selected attribute outputs 586. In other embodiments the validity score 588 may be more than 25%, more than 50%, more than 75%, more than 90%, more than 99%, and the like. With this in mind, in some instances, the CMDB data validator 414 may determine the LLM 412 has successfully extracted and parsed a file corresponding to the IP address 590, the port 592, and the connection type 594, however the URL 596, and the instance 598 have not been extracted. In this manner, the validity score 588 has not been satisfied. As such, the approval widget 508 may alert the user and/or the prompt-directed probe generator that the threshold based on the similarity (e.g., validity score) has not been met and return to the input widget 504. In this manner, the prompt 518 and/or the selected attribute type 520 may be updated (e.g., an updated prompt) and the LLM may execute and parse the configuration file for an additional time. In some instances, the threshold is satisfied and the execute widget 506 may proceed to a subsequent step. That is the IP address 590, the port 592, the connection type 594, the URL 596, and the instance 598 are parsed and extracted as the selected attribute outputs 586.

In some embodiments, the prompt-directed probe generator may proceed to the output probe step 550 of the execute widget 506. That is the probe generation stage 402 may output the probe. The probe may be based on extracted attributes of the configuration file, as determined or selected based on a user-provided prompt in certain embodiments, and may include one or more connection steps. The one or more connection steps may include steps used by the LLM 412 to parse and extract the selected attribute outputs 586. For example, the connection steps may include one or more encryption steps, one or more decryption steps, one or more extraction steps, one or more file creation steps, one or more parse command steps, one or more directory installation steps, and the like. In this manner, the probe may be a code that may be used to discover selected attributes (e.g., CIs) associated with various components of the enterprise.

The prompt-directed probe generator may proceed to the probe execution stage 404. In this manner, the probe output by the probe generation stage 402 may be used to execute discovery. The probe may execute CI discovery including finding various components (e.g., CIs) of the enterprise. CIs serve as building blocks of the customer instance CMDB 422 (e.g., resource management database) and may be used to track various components of the enterprise. One or more CIs may be discovered via the probe through discovery and/or service mapping. In some instances, CI discovery by the probe is executed via a horizontal method and/or a top down CI generation approach that maps components of the enterprise based on connections between the various components. In some embodiments, the probe discovers various components of the enterprise and stores the CIs within the customer instance CMDB 422.

Figure 9:
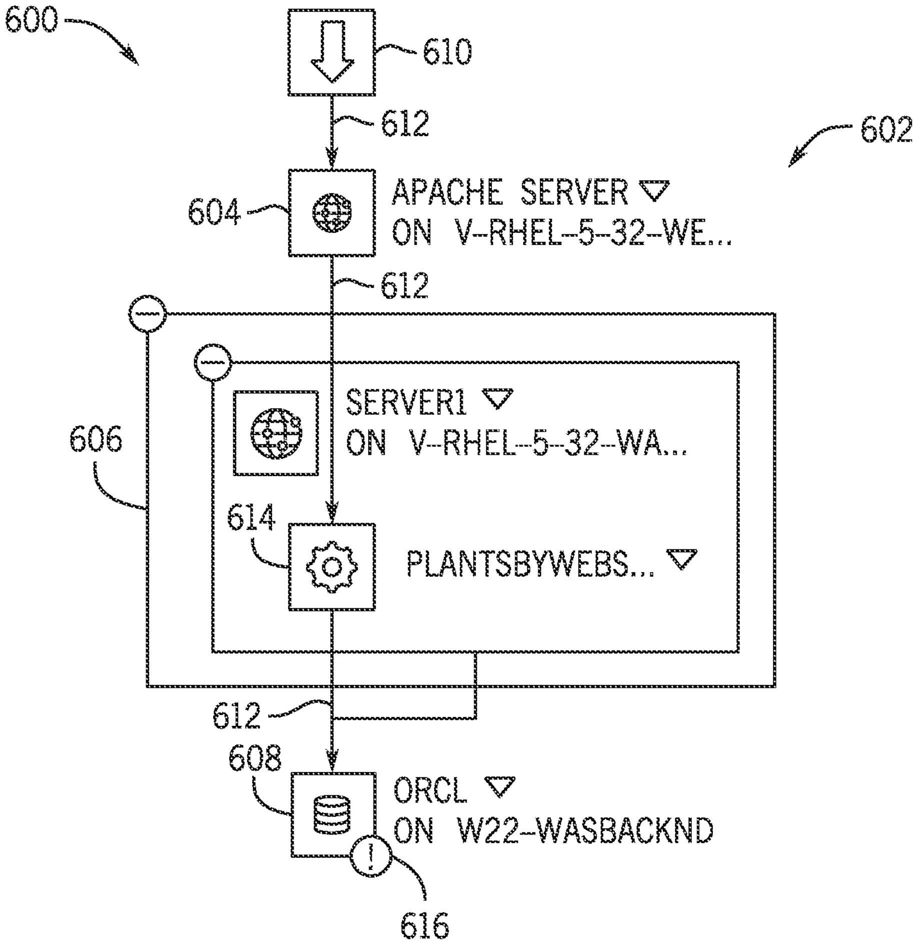
FIG. 9 is a schematic embodiment of a map screen of a user interface, in accordance with aspects of the present disclosure.

Referring now to FIG. 9, the prompt-directed probe generator may display a map screen 600 on the user interface. In some embodiments, the prompt-directed probe generator may proceed to the CMDB maintenance stage 406 and output a map 602 (e.g., service map, discovery map) based on one or more CIs 604, 606, 608 discovered via the probe. As such, the one or more CIs 604, 606, 608 may be organized to allow the enterprise's IT infrastructure to be tracked. For example, a network starting point 610 may begin the flow of the map 602 of a network. In this manner, one or more connectors 612 may show the relationship between the CIs 604, 606, 608. As such, a first CI 604 may represent a web related service of the network (e.g., NGINX, JBoss, etc.). A second CI 606 may represent one or more applications 614 (e.g., SQL servers, Microsoft IIS, etc.) on the network. As shown, in some instances, the second CI 606 may be expanded to show one or more CIs designated as redundant. A third CI 608 may represent a data storage device (e.g., fiber channel, hard drive, etc.) within the map 602.

With the foregoing in mind, the map 602 may allow a user of the prompt-directed probe generator to visualize the CIs discovered during the probe execution stage 404. In this way the map 602 may allow for streamlined tracking and storage of the CIs during the CMDB maintenance stage 406. In some embodiments, the map 602 may display a plurality of alerts 616 associated with one or more CIs of the map 602. The alerts 616 may include an indicator of a type of alert associated with the CIs and/or a level of urgency/importance of a particular alert. For example, the alerts 616 may include indicators associated with affected CIs, open alerts, change requests, open incidents, outages, and the like. For example, the alert could include an incident, an outage, and/or a request based on one or more threshold values associated with the CI. In some instances, the user interface including the plurality of widgets may display alerts as a notification to the user on one or more respective profiles related to the alerts 616 associated with the CMDB maintenance stage 406 of the prompt-directed probe generator.

Figure 10:
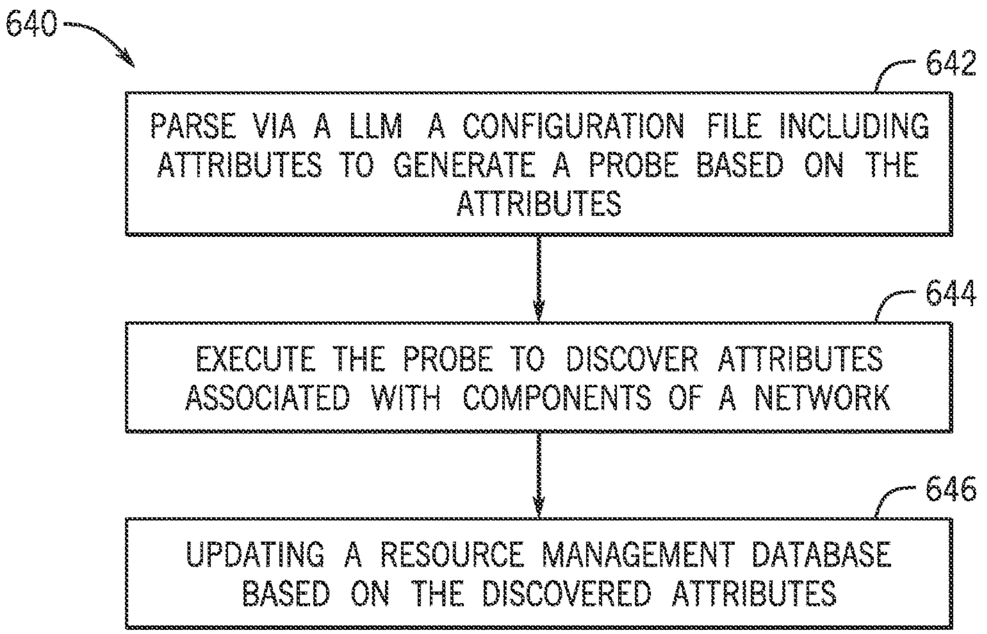
FIG. 10 is a flow diagram of acts performed by a prompt-directed probe generator generating a probe, in accordance with aspects of the present disclosure.

Referring now to FIG. 10 the prompt-directed probe generator may perform a process 640 for generating a probe for use in a discovery operation, as discussed herein. The process 640 may be performed by a computing device or controller disclosed above with reference to FIG. 1 or any other suitable computing device(s) or controller(s). Furthermore, the blocks of the process 640 may be performed in the order disclosed herein or in any suitable order. For example, certain blocks of the process may be performed concurrently. In addition, in certain embodiments, at least one of the blocks of the process 640 may be omitted. Further, it should be noted, that the prompt-directed probe generator may iteratively perform the blocks outlined in process 640.

At block 642 of the process 640, the prompt-directed probe generator may parse, via an LLM, a configuration file comprising one or more attributes associated with one or more components of a network (e.g., a network of an enterprise) to generate a probe based on the attributes. In some embodiments, the one or more components may include one or more hardware components, one or more software components, one or more additional components, or a combination thereof. In this manner, the LLM may parse the configuration file associated with the one or more attributes of the components. In some instances, the one or more attributes may include various attributes desired to be tracked in CIs by IT of an enterprise. In some instances, the LLM may output the one or more attributes (e.g., selected attributes) and output the probe (e.g., discovery probe). For example, the probe may include on or more probes that may include a code used to extract and parse the attributes from the configuration file of the associated component. It should be noted, that the probe may be generalized to a type of component. That is, the code may be able to extract and parse attributes of one or more additional components with one or more additional configuration files.

At block 644 of the process 640, the probe may be executed to discover attributes associated with the components of the network. In some embodiments, executing discovery may include a discovery process. For example, the discovery process may include a horizontal discovery process and/or a top down service mapping process. In some instances, the probe may discover the one or more attributes associated with the component of the enterprise. However, it should be noted, that in some embodiments the probe may discover a CI including the one or more attributes associated with the component. That is, the CI may include one or more attributes. In some instances, the probe may discover one or more CIs associated with various components of the enterprise.

At block 646 of the process 640, a resource management database (e.g., a CMDB, a customer instance CMDB) may update based on the discovered attributes provided from executing the probe in discovery. In some instances, the resource management database may store the attributes and/or the CIs discovered by the probe. Further, in some embodiments, a user interface of the resource management database may display a map (e.g., service map, discovery map) to provide visualization of one or more attributes and/or one or more CIs discovered by the probe. In some instances, the map may include one or more connectors to demonstrate relationships between the attributes and/or CIs. Further, in some instances, the map may include one or more alerts associated with the attributes and/or CIs. In this manner, the alerts may indicate to a user that the various attributes and/or CIs may require management.

Figure 11:
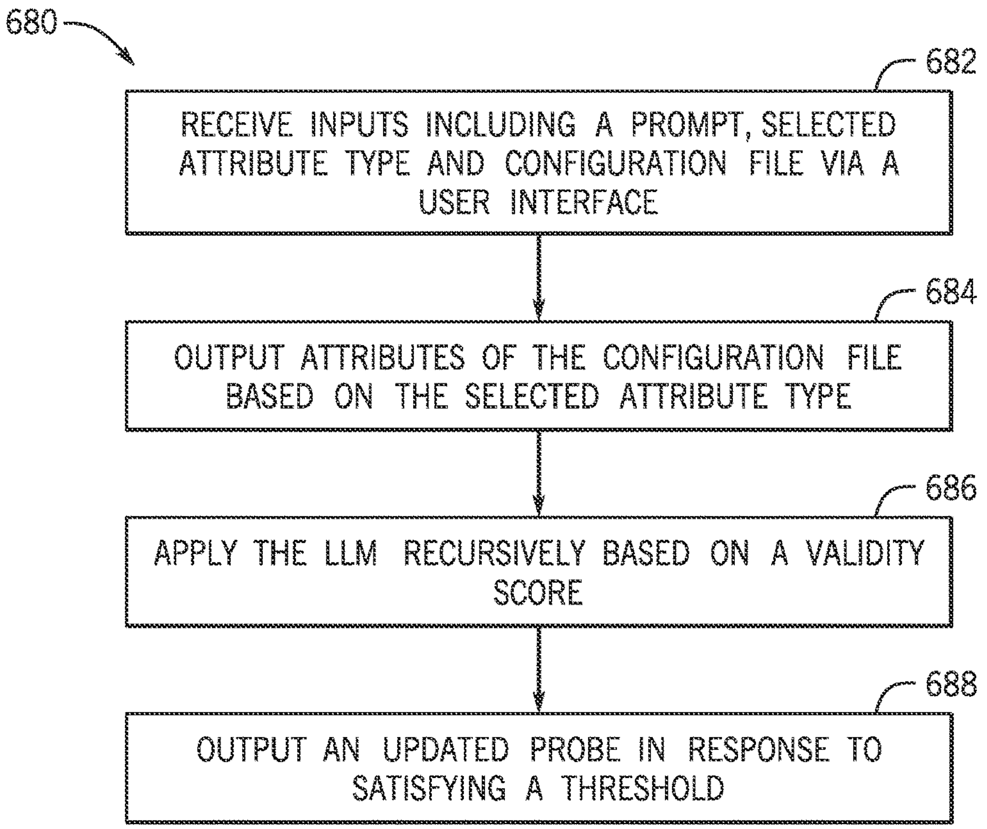
FIG. 11 is a flow diagram of acts performed by the prompt-directed probe generator determining a validity of the probe, in accordance with aspects of the present disclosure.

Referring now to FIG. 11, the prompt-directed probe generator may perform a process 680 for determining a validity of the probe. The process 680 may be performed by a computing device or controller disclosed above with reference to FIG. 1 or any other suitable computing device (s) or controller(s). Furthermore, the blocks of the process 680 may be performed in the order disclosed herein or in any suitable order. For example, certain blocks of the process may be performed concurrently. In addition, in certain embodiments, at least one of the blocks of the process 680 may be omitted. Further, it should be noted, that the prompt-directed probe generator may iteratively perform the blocks outlined in process 680.

At block 682 of the process 680, the prompt-directed probe generator may receive one or more inputs via a user interface (e.g., smart probe discovery GUI). In some embodiments, the input may include a prompt, one or more selected attribute type, a configuration file, and/or a configuration file path. For example, the prompt may be indicative of instructions to identify the one or more attribute type as indicated on the user interface. In some instances, the attribute type may include a name, an IP address, a port, an instance, an operating system, and the like. It should be noted, that the selected attribute type may depend on a type of component (e.g., hardware component, software component, additional component) desired to be discovered by the prompt-directed probe generator.

At block 684 of the process 680, the prompt-directed probe generator may output attributes (e.g., selected attributes) of the configuration file of the associated component of the enterprise based on the selected attribute type provided as input. In some embodiments, the attributes may be output during an execution of the LLM. For example, the LLM may receive the inputs as noted by block 682, extract and parse the attributes on the component of the enterprise, and output the selected attributes. It should be noted, that in some instances a probe may be output by the LLM concurrently or sequentially to output of the attributes.

At block 686 of the process 680, the prompt-directed probe generator may apply the LLM recursively (e.g., iteratively) based on a validity score. The validity score may be based on a correlation of the one or more selected attribute type and the one or more attributes. That is, the validity score may be received as an additional input via the user interface and may indicate a threshold indicative of satisfying the validity score. As such, in some embodiments, the threshold may not be satisfied. As such, the prompt-directed probe generator may return to block 684. In this manner, the user interface may receive an updated prompt. In some instances, the updated prompt may include one or more modifications to the prompt based on differences between the one or more selected attribute type and the one or more attributes output by the LLM. In this manner, the LLM may iteratively perform a cycle of receiving a prompt (e.g., an updated prompt), parsing an associated configuration file based on the prompt, outputting one or more selected attributes, evaluating the output based on the validity score, and determining if the validity score satisfies the threshold. In certain embodiments, the validity score satisfies the threshold.

With this in mind, at block 688 of the process 680, the prompt-directed probe generator may output an updated probe in response to satisfying the threshold. In this manner, the updated probe may be used to execute a discover process. As such, attributes of one or more components of the enterprise may be discovered and stored within a resource management database. In this manner, the prompt-directed probe generator may provide a process of generating probes without a need for hard-coding each step required in generating a probe.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method comprising:

receiving a configuration file and a prompt, wherein the configuration file comprises a plurality of attributes associated with one or more components of a network, and wherein the prompt comprises one or more selected attribute types;

generating, via a Large Language Model (LLM), a probe by parsing the plurality of attributes in the configuration file to identify one or more attributes corresponding to the one or more selected attribute types, wherein the probe comprises computer-implemented instructions to extract data corresponding to the one or more selected attribute types from the configuration file;

executing the probe for during a configuration item discovery operation to extract the data corresponding to the one or more attributes from the configuration file; and updating a resource management database based on the data corresponding to the one or more attributes.

2. The method of claim 1, comprising:

recursively applying the LLM to the configuration file based on the one or more selected attribute types to identify the one or more attributes in the configuration file; and generating an updated probe based on the one or more attributes.

3. The method of claim 1, comprising providing a probe discovery graphical user interface (GUI) configured to receive an input corresponding to the configuration file, and wherein the probe discovery GUI is configured to display the one or more attributes, the probe, or a combination thereof.

4. The method of claim 3, wherein the probe discovery GUI is configured to receive an additional input indicative of modification, approval, or a combination thereof, of the one or more attributes, the probe, or a combination thereof.

5. The method of claim 1, wherein the one or more components of the network comprise one or more hardware components, one or more software components, one or more additional components, or a combination thereof.

6. The method of claim 4, comprising executing the probe in response to receiving the additional input indicating approval of the probe.

7. The method of claim 1, wherein a configuration item (CI) comprises or is described by the one or more attributes.

8. The method of claim 1, wherein the resource management database comprises a map indicative of the one or more attributes, and wherein the one or more attributes are associated with an enterprise.

9. The method of claim 1, wherein the configuration item discovery operation comprises a top down service mapping operation.

10. A method, comprising:

receiving, via an interface, one or more inputs comprising one or more selected attribute types associated with one or more components of a network, a configuration file comprising a plurality of attributes, and a prompt indicative of instructions to identify the one or more selected attribute types;

generating, via a Large Language Model (LLM), a probe by parsing the plurality of attributes in the configuration file to identify one or more attributes corresponding to the one or more selected attribute types, wherein the probe comprises computer-implemented instructions to extract data corresponding to the one or more selected attribute types from the configuration file;

recursively applying the LLM to the configuration file based on a validity score, wherein the validity score is based on a correlation between the one or more selected attribute types and the one or more attributes identified by the LLM parsing the configuration file;

determining that the validity score satisfies a threshold; and outputting an updated probe in response to the validity score satisfying the threshold, wherein outputting the updated probe comprises outputting the updated probe for display via the interface.

11. The method of claim 10, comprising:

executing the probe during a configuration item discovery operation to extract the data corresponding to the one or more attributes from the configuration file; and updating a resource management database based on the data corresponding to the one or more attributes.

12. The method of claim 11, wherein the resource management database comprises a map indicative of the one or more attributes, and wherein the one or more attributes are associated with an enterprise.

13. The method of claim 10, wherein recursively applying the LLM to the configuration file comprises updating the prompt based on an alert to the interface.

14. The method of claim 10, wherein the interface is configured to display the one or more attributes, the probe, the updated probe, or a combination thereof.

15. The method of claim 10, wherein the one or more inputs specifying the configuration file comprises a portion of the configuration file, a path associated with the configuration file, or both.

16. The method of claim 10, comprising receiving, via the interface, an indication of the threshold.

17. A non-transitory computer-readable storage medium, comprising processor-executable routines that, when executed by a processor, cause the processor to perform operations comprising:

receiving a configuration file and a prompt, wherein the configuration file comprises a plurality of attributes associated with one or more components of a network, and wherein the prompt comprises one or more selected attribute types;

generating, via a Large Language Model (LLM), a probe by parsing the plurality of attributes in the configuration file to identify one or more attributes corresponding to the one or more selected attribute types, wherein the probe comprises computer-implemented instructions to extract data corresponding to the one or more selected attribute types from the configuration file;

executing the probe during a configuration item discovery operation to extract the data corresponding to the one or more attributes from the configuration file; and updating a resource management database based on the data corresponding to the one or more attributes.

18. The non-transitory computer-readable storage medium of claim 17, wherein the processor performs operations comprising receiving the configuration file via an input to an interface specifying a path of the configuration file.

19. The non-transitory computer-readable storage medium of claim 17, wherein the processor performs operations comprising:

recursively applying the LLM to the configuration file based on a validity score;

determining that the validity score satisfies a threshold; and outputting an updated probe in response to the validity score satisfying the threshold, wherein outputting the updated probe comprises outputting the probe for display via an interface.

20. The non-transitory computer-readable storage medium of claim 19, wherein the validity score is based on a correlation between the one or more selected attribute types and the one or more attributes.

* * * * *